(12) United States Patent
Hsu et al.

(10) Patent No.: US 9,709,082 B2
(45) Date of Patent: Jul. 18, 2017

(54) BUCKLE ASSEMBLY

(71) Applicant: Frank Hsu, Chino, CA (US)

(72) Inventors: Frank Hsu, Chino, CA (US); Tao Lin, CHino, CA (US); Tony Hsu, Chino, CA (US)

( * ) Notice: Subject to any disclaimer, the term of this patent is extended or adjusted under 35 U.S.C. 154(b) by 0 days.

(21) Appl. No.: 14/847,811

(22) Filed: Sep. 8, 2015

(65) Prior Publication Data

US 2016/0174667 A1 Jun. 23, 2016

Related U.S. Application Data

(60) Provisional application No. 62/095,265, filed on Dec. 22, 2014.

(51) Int. Cl.
*A44B 11/25* (2006.01)
*F16B 2/10* (2006.01)
*F16B 2/18* (2006.01)
*F16B 2/06* (2006.01)

(52) U.S. Cl.
CPC ............ *F16B 2/10* (2013.01); *A44B 11/2519* (2013.01); *F16B 2/06* (2013.01); *F16B 2/18* (2013.01); *Y10T 24/45508* (2015.01); *Y10T 24/45628* (2015.01); *Y10T 24/45702* (2015.01)

(58) Field of Classification Search
CPC . A44B 11/266; A44B 11/2519; A44B 11/263; A44B 11/2569; Y10T 24/45251; Y10T 24/45215; Y10T 24/45529; Y10T 24/45241; Y10T 24/45602; Y10T 24/45675; Y10T 24/3413; Y10T 24/45702; Y10T 24/45628; Y10T 24/45508; F16B 2/10; F16B 2/06
See application file for complete search history.

(56) References Cited

U.S. PATENT DOCUMENTS

| | | | |
|---|---|---|---|
| 6,311,374 B1 * | 11/2001 | Anscher | A44B 11/263 24/625 |
| 9,232,833 B2 * | 1/2016 | Paik | A44B 11/263 |
| 9,402,447 B2 * | 8/2016 | Hortnagl | A44B 11/2519 |
| 9,415,247 B2 * | 8/2016 | Schurian | A62B 35/0025 |
| 9,521,882 B2 * | 12/2016 | Hung | A44B 11/2511 |

* cited by examiner

*Primary Examiner* — Robert J Sandy
*Assistant Examiner* — Michael Lee
(74) *Attorney, Agent, or Firm* — Tsz Lung Yeung

(57) ABSTRACT

A buckle assembly includes a first buckle member, a second buckle member and a locking arrangement. The first buckle member includes a first buckle body and an insertion member. The second buckle member includes a second buckle body having a receiving slot, a first buckle latch and a second buckle latch pivotally connected to the second buckle body to move between a locked position and an unlocked position, and a plurality of resilient elements mounted in the second buckle body. The locking arrangement includes a first locking member extended from one of the first buckle member and the second buckle member to retain one of the first buckle latch and the second buckle latch at a locked position.

11 Claims, 10 Drawing Sheets

BUCKLE ASSEMBLY

BACKGROUND OF THE PRESENT INVENTION

Field of Invention

The present invention relates to buckle, and more particularly to a buckle assembly which comprises a locking arrangement which is capable of providing an enhanced locking performance and convenient operation of the buckle assembly.

Description of Related Arts

A conventional buckle assembly, such as a buckle assembly for use with a webbing strap, usually comprises a first buckle member and a second buckle member which may be detachably engaged with the first buckle member. The first buckle member may have an insertion member while the second buckle member may comprise a plurality of buckle latches and have a receiving slot formed at a position corresponding to the insertion member of the first buckle member. The receiving slot is shaped and sized to receive the insertion member so as to connect the first buckle member to the second buckle member. The buckle latches may be pivotally moved on the second buckle member to lock up the insertion member in the receiving slot. Typically, the first buckle member and the second buckle member are adjustably connected to two end portions of a webbing strap so that the buckle assembly may be utilized for fastening the webbing strap onto a human body, or to an external object.

There are several disadvantages in relation to the above-mentioned buckle assembly. First, the first buckle member and the second buckle member are usually locked by the buckle latches, and this locking mechanism is far from reliable. When the insertion member of the first buckle member is inserted into the receiving slot of the second buckle member, the locking latches may be urged by a plurality of resilient elements to engage with the insertion member and lock up the insertion member in position. The locking latches prevent the insertion member from being pulled out by external force. In order to release the insertion member from the receiving slot, a user may pivotally move the locking latches from an exterior of the second buckle member for disengaging the locking latches from the insertion member. When locking latches are pivotally moved to disengage from the insertion member, it may be manually pulled out of the receiving slot. Conventionally, the locking latches are partially exposed to an exterior of the second buckle member so that the user may manually access the locking latches for unlocking the first buckle member from the second buckle member. As a result, the locking latches may be accidentally actuated so that first buckle member may accidentally disengage from the second buckle member.

Second, even if the first buckle member and the second buckle member are engaged with each other in a proper manner, the engagement may be not secure enough so that there may exist a lot of lateral movement between the first buckle member and the second buckle member.

As a result, there is a need to develop a buckle assembly which is enough when engaged.

SUMMARY OF THE PRESENT INVENTION

An objective of the present invention is to provide a buckle assembly which is capable of providing an enhanced locking performance and convenient operation.

Another objective of the present invention is to provide a buckle assembly which comprises a locking arrangement arranged to provide a triple locking mechanism for locking a first buckle member with a second buckle member.

Another objective of the present invention is to provide a buckle assembly which comprises a locking arrangement which is capable of preventing the locking latches of the buckle assembly to be accidentally actuated.

Another objective of the present invention is to provide a buckle assembly which comprises a locking arrangement adapted to minimize a relative movement between the first buckle member and the second buckle member.

In one aspect of the present invention, it provides a buckle assembly, comprising:

a first buckle member which comprises a first buckle body comprising an insertion member;

a second buckle member, which comprises:

a second buckle body having a receiving slot formed at a position corresponding to the inserting member of the first buckle body;

a first buckle latch and a second buckle latch connected to the second buckle body, each of the first buckle latch and the second buckle latch being arranged to move between a locked position and an unlocked position, wherein in the unlocked position, each of the first buckle latch and the second buckle latch is pivotally moved to allow the insertion member of the first buckle body to be inserted in the receiving slot, wherein in the locked position, each of the first buckle latch and the second buckle latch is pivotally moved to lock up the insertion member of the first buckle body in the receiving slot; and a plurality of resilient elements mounted in the second buckle body to normally exert an urging force to normally retain the first buckle latch and the second buckle latch in the locked position respectively; and a locking arrangement, which comprises a first locking member extended from one of the first buckle member and the second buckle member to retain one of the first buckle latch and the second buckle latch at the locked position.

DETAILED DESCRIPTION OF THE PREFERRED EMBODIMENT

Figure 1:
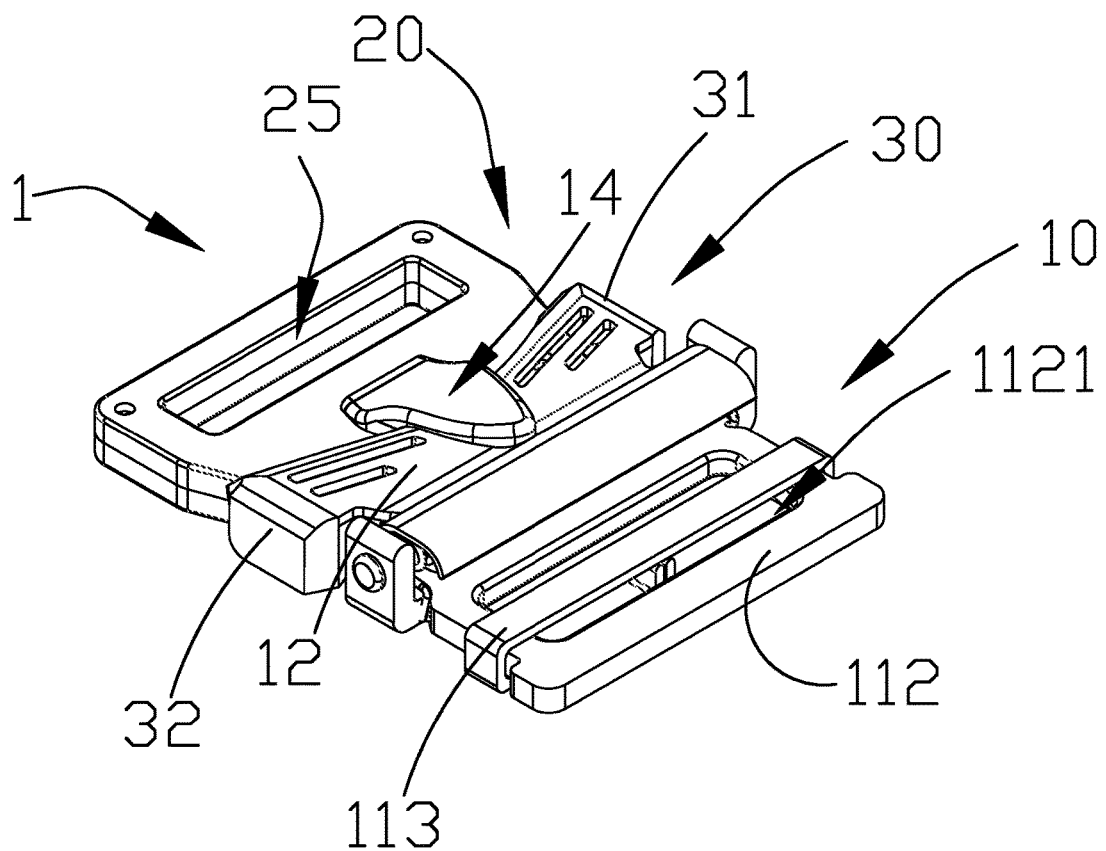
FIG. 1 is a perspective view of a buckle assembly according to a preferred embodiment of the present invention.
Figure 2:
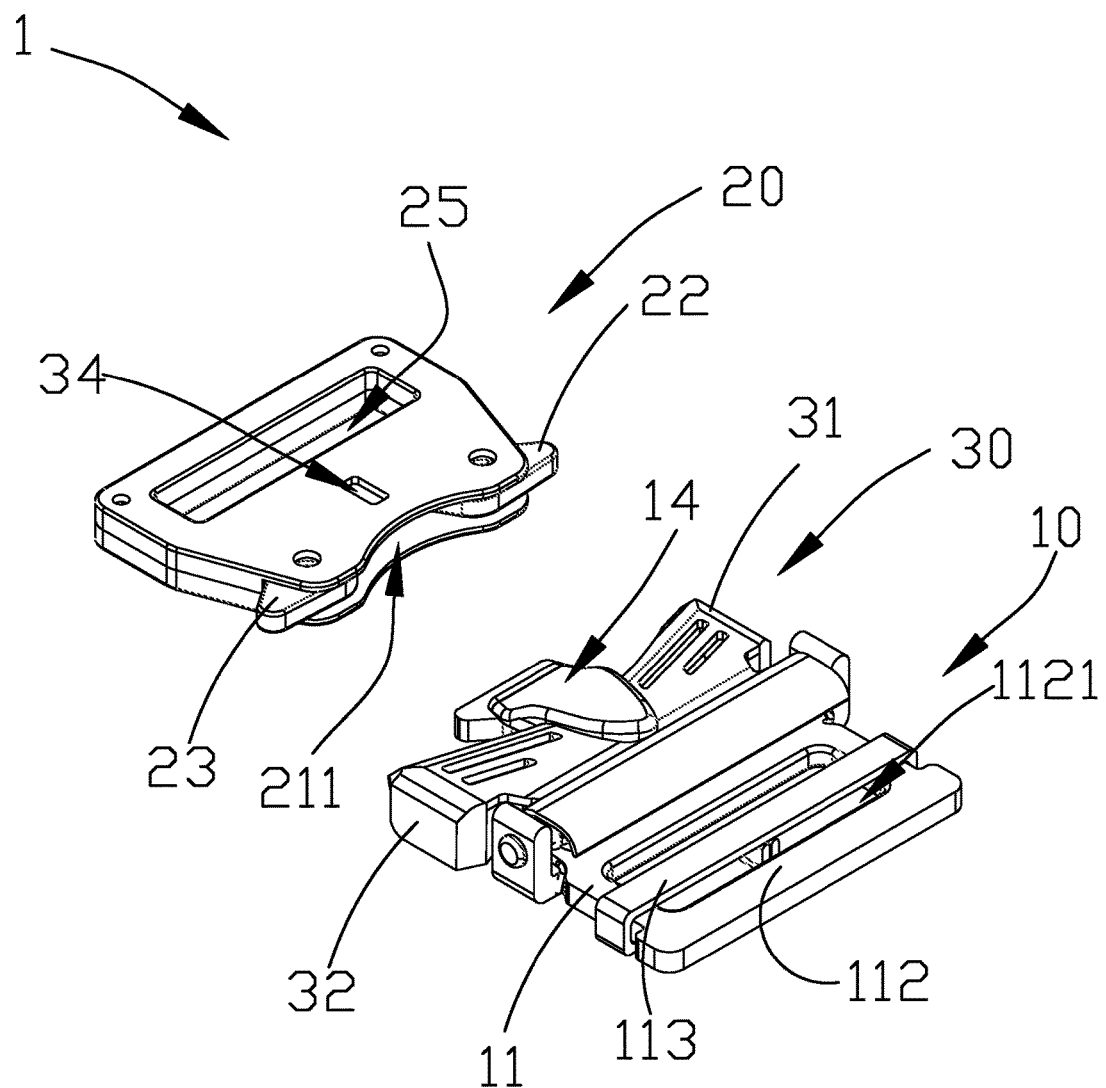
FIG. 2 is an exploded perspective view of the buckle assembly according to the preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 6 and FIG. 7A to FIG. 7B of the drawings, a buckle assembly 1 according to a preferred embodiment of the present invention is illustrated. Broadly, the buckle assembly 1 comprises a first buckle member 10, a second buckle member 20, and a locking arrangement 30.

The first buckle member 10 may comprise a first buckle body 11 comprising an insertion member 111.

The second buckle member 20 may comprise a second buckle body 21, a first buckle latch 22, a second buckle latch 23, and a plurality of resilient elements 24. The second buckle body 21 may have a receiving slot 211 formed at a position corresponding to the inserting member 111 of the first buckle body 11.

The first buckle latch 22 and the second buckle latch 23 may be connected to the second buckle body 21. Each of the first buckle latch 22 and the second buckle latch 23 may be arranged to move between a locked position and an unlocked position, wherein in the unlocked position, each of the first buckle latch 22 and the second buckle latch 23 is pivotally moved to allow the insertion member 111 of the first buckle body 11 to be inserted in the receiving slot 211, wherein in the locked position, each of the first buckle latch 22 and the second buckle latch 23 is pivotally moved to lock up the insertion member 111 of the first buckle body 11 in the receiving slot 211.

The plurality of resilient elements 24 may be mounted in the second buckle body 21 to normally exert an urging force to normally retain the first buckle latch 22 and the second buckle latch 23 in the locked position respectively.

The locking arrangement 30 may comprise a first locking member 31 extended from one of the first buckle member 10 and the second buckle member 20 to retain one of the first buckle latch 22 and the second buckle latch 23 at the locked position.

According to the preferred embodiment of the present invention, the buckle assembly may be used in conjunction with a webbing strap 80 so that the webbing strap 80 may be worn by a person who may need to bear extensive loading. Alternatively, the webbing strap 80 may also be fastened to an external object.

The first buckle body 11 of the first buckle member 10 may further comprise a connecting member 112 for connecting with a first end portion 81 of the webbing strap 80. The connecting member 112 may have a first connecting slot 1121 formed therein. The first buckle body 11 may further comprise a connecting shaft 113 extended across the first connecting slot 1121, so that the first end portion 81 of the webbing strap 80 may be adjustably fastened to the first buckle body 11 by repetitively passing through the first connecting slot 1121 and fasten on the connecting shaft 113.

Figure 3:
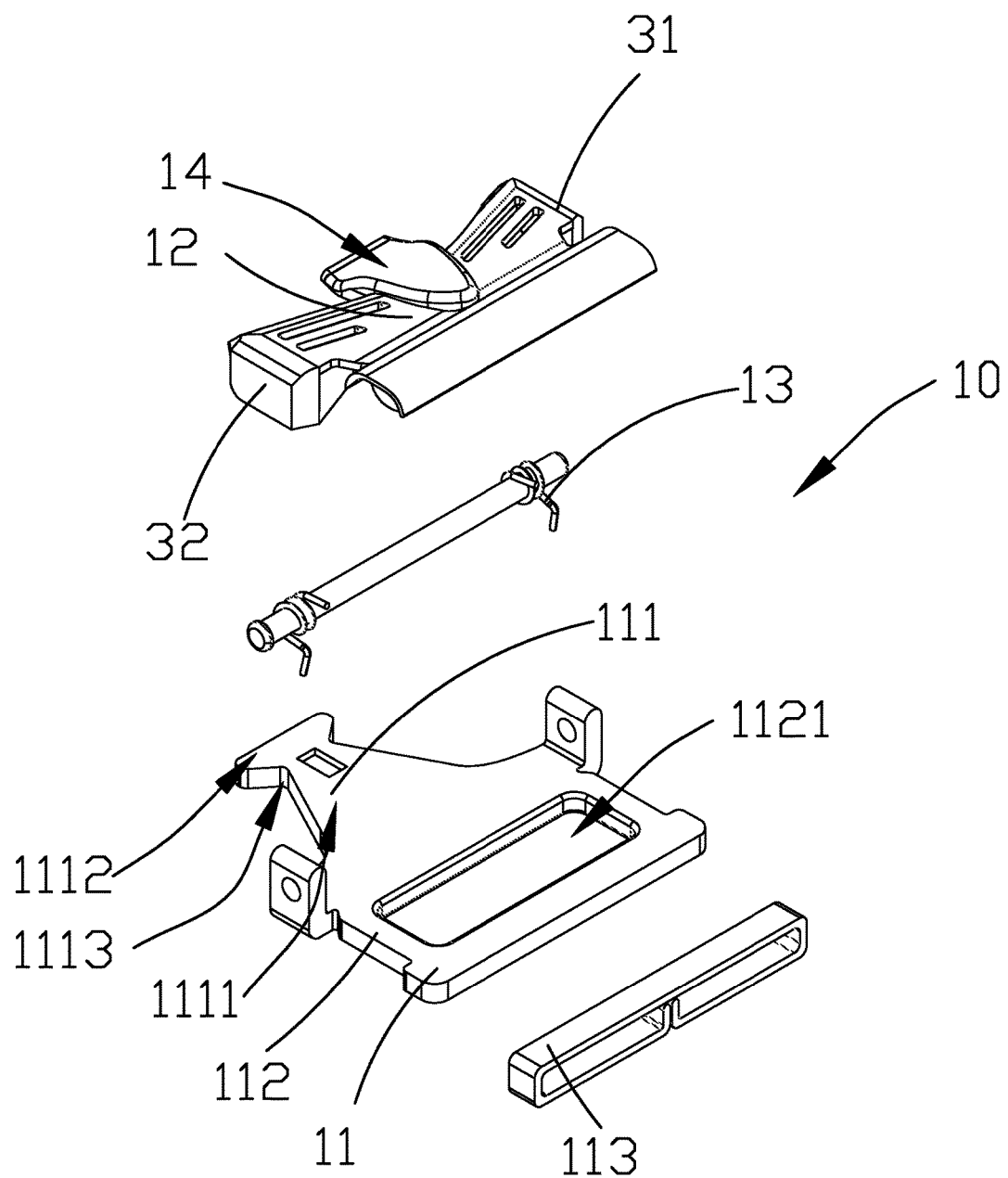
FIG. 3 is an exploded perspective view of a first buckle body of the buckle assembly according to the preferred embodiment of the present invention.
Figure 4:
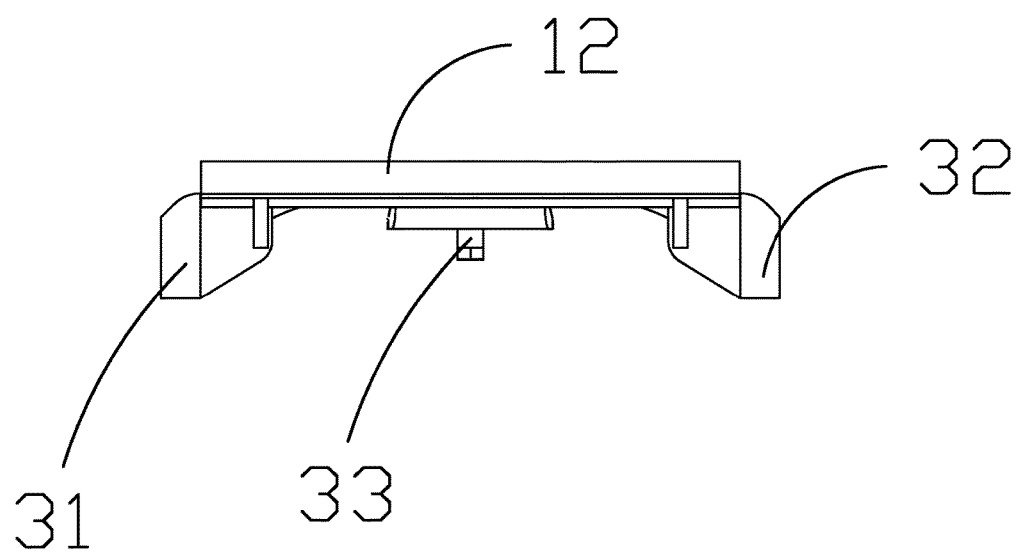
FIG. 4 is a front view of a covering panel according to the preferred embodiment of the present invention.
Figure 5:
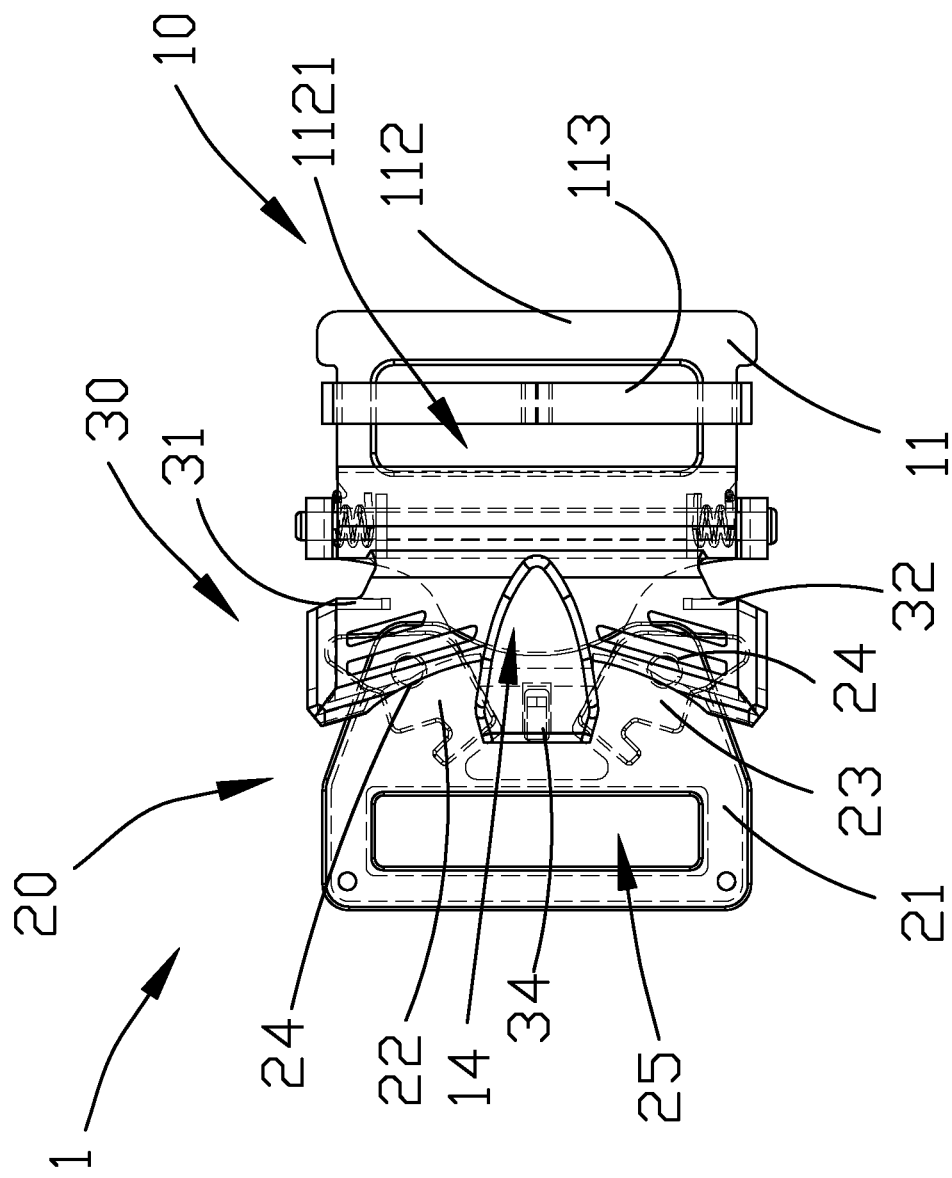
FIG. 5 is a plan view of the buckle assembly according to the preferred embodiment of the present invention.
Figure 6:
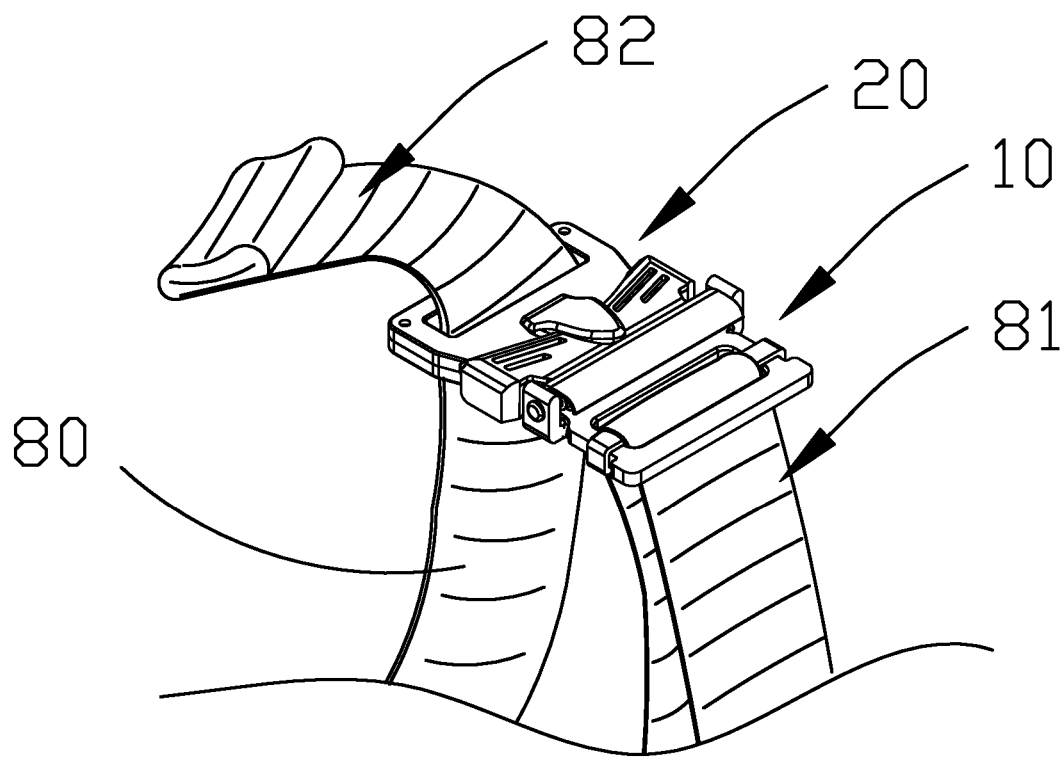
FIG. 6 is a schematic diagram of the buckle assembly according to a preferred embodiment of the present invention.

The insertion member 111 may be integrally extended from the first connecting member 112 for selectively receiving in the receiving slot 211. The insertion member 111 may have a contracting portion 1111 and an engaging portion 1112 extended from the contracting portion 1111 to form an engagement shoulder 1113 at an intersection between the contracting portion 1111 and the engaging portion 1112. As shown in FIG. 3 of the drawings, the contracting portion 1111 may have a substantially triangular cross sectional shape. Thus, a width of the contracting portion 1111 is gradually decreasing from the connecting member 112 toward the engaging portion 1112. On the other hand, the engaging portion 1112 may also have a substantially triangular cross sectional shape in such a manner that a width of the engaging portion 1112 is gradually increasing from the contracting portion 1111 toward a free end of the engaging portion 1112. At a result, a width of the insertion member 111 may be at the minimum at the intersection between the contracting portion 1111 and the engaging portion 1112, and this may constitute the engagement shoulder 1113 of the insertion member 111. In other words, each side edge of the insertion member 111 may form a "V" cross sectional shape.

The first buckle member 10 may further comprise a covering member 12 movably coupled to the first buckle body 11. The covering member 12 may be pivotally connected to the first buckle body 11 so that it may pivotally move about a transverse direction of the first buckle body 11.

Specifically, the covering member 12 may be a panel-like member which is pivotally mounted to the first buckle body 11. The locking arrangement 30 may be provided on the covering member 12 so as to restrict unwanted movement of the first buckle latch 22 and the second buckle latch 23. As shown in FIG. 1 to FIG. 3 and FIG. 4 of the drawings, the locking arrangement 30 may further comprise a second locking member 32, wherein the first locking member 31 and the second locking member 32 may be downwardly extended from two side edges of the covering member 12 respectively for covering the exposed part of the first buckle latch 22 and the second buckle latch 23 when the second buckle member 20 is coupled with the first buckle member 10. The first buckle member 10 may further comprise an elastic element 13 mounted on the first buckle body 11 to normally exert an elastic urging force toward the covering member 12.

One may appreciate that when the first buckle member 10 is coupled with the second buckle member 20, the exposed parts of the first buckle latch 22 and the second buckle latch 23 are well-protected and covered by the first locking member 31 and the second locking member 32 respectively so that the first buckle latch 22 and the second buckle latch 23 are prevented from being accidentally actuated from an exterior of the second buckle member 20. Thus, unwanted or undesired movement of the first buckle latch 22 and the second buckle latch 23 may be effectively prevented.

The locking arrangement 30 may further comprise a third locking member 33 downwardly extended from a front extension portion 14 of the covering member 12, and contain a locking slot 34 indently formed on the second buckle body 21. When the first buckle member 10 is coupled with the second buckle member 20, the third locking member 33 may be pivotally moved to engage with the locking slot 34 so as to prevent unwanted movement of between the first buckle member 10 and the second buckle member 20. The third locking member 33 may be used to reinforce locking performance between the first buckle member 10 and the second buckle member 20.

The second buckle member 20 may further have a through second connecting slot 25 formed on the second buckle body 21, wherein second end portion 82 of the webbing strap 80 may be arranged to pass through the second connecting slot 25 so as to be adjustably fastened on the second buckle body 21.

The resilient elements 24 of the second buckle member 20 is mounted to one end (unexposed end) of the first buckle latch 22 and the second buckle latch 23 for normally retaining the first buckle latch 22 and the second buckle latch 23 at the locked position.

Figure 7A:
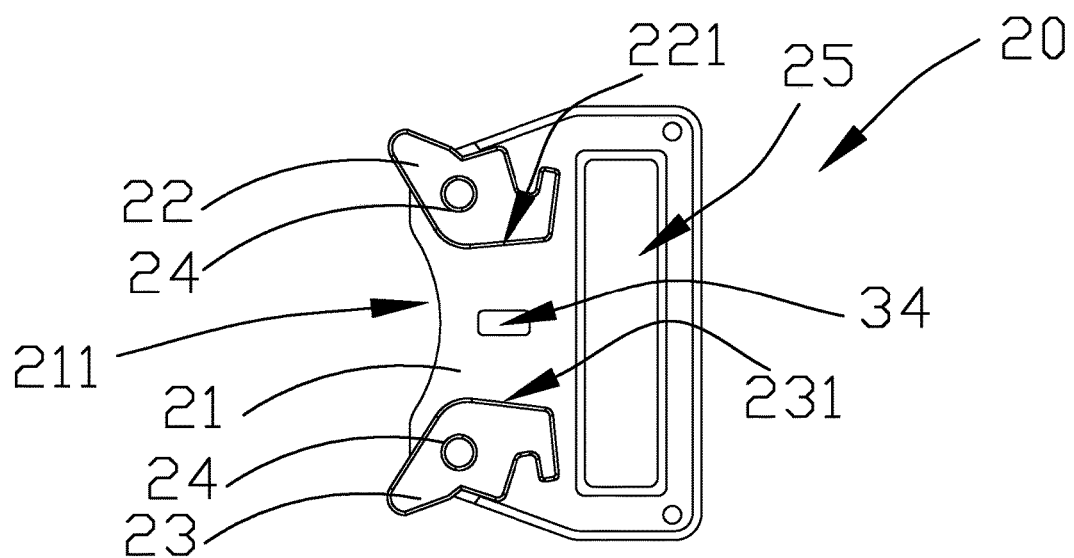
FIG. 7A and FIG. 7B are schematic diagrams of a second buckle member according to the preferred embodiment of the present invention, illustrating that the first buckle latch and the second buckle latch are in locked position and unlock position respectively.
Figure 7B:
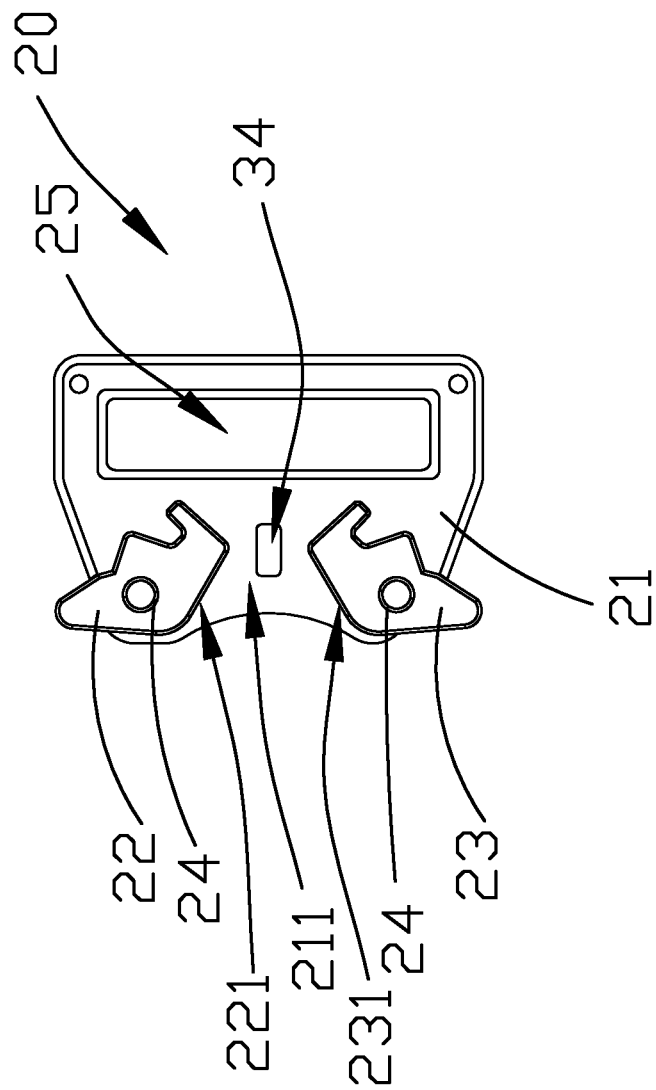

Referring to FIG. 7A to FIG. 7B of the drawings, each of the first buckle latch 22 and the second buckle latch 23 may have a slanted surface 221, 231 facing each other. When the first buckle latch 22 and the second buckle latch 23 are in the locked position, the slanted surfaces 221, 231 are arranged to face toward the opening of the receiving slot 211 and also each other. The slanted surfaces 221, 231 may be arranged to engage with the engaging portion 1112 of the insertion member 111.

The operation of the present invention may be as follows: the first buckle member 10 and the second buckle member 20 are normally separated from each other. The insertion member 111 of the first buckle body 11 may be inserted into the receiving slot 211 of the second buckle body 21. When the insertion member 111 is inserted into the receiving slot 211, the engaging portion 1112 of the insertion member 111 may be arranged to bias against the slanted surfaces 221, 231 so as to pivotally move the first buckle latch 22 and the second buckle latch 23 until the they engage with the engagement shoulder 1113 of the insertion member 111. At that time, the first buckle latch 22 and the second buckle latch 23 are urged by the resilient elements 24 to move back to the locked position.

At the same time, the covering member 12 is pushed to engage with the locking slot 34 for further reinforcing a locking performance between the first buckle member 10 and the second buckle member 20. When the first locking member 31, the second locking member 32 and the third locking member 33 are properly positioned, the first buckle member 10 and the second buckle member 20 are securely locked with each other and the first buckle latch 22 and the second buckle latch 23 are substantially prevented from being accidentally actuated or moved so as to prevent the first buckle member 10 from accidentally disengaging from the second buckle member 20.

Figure 8:
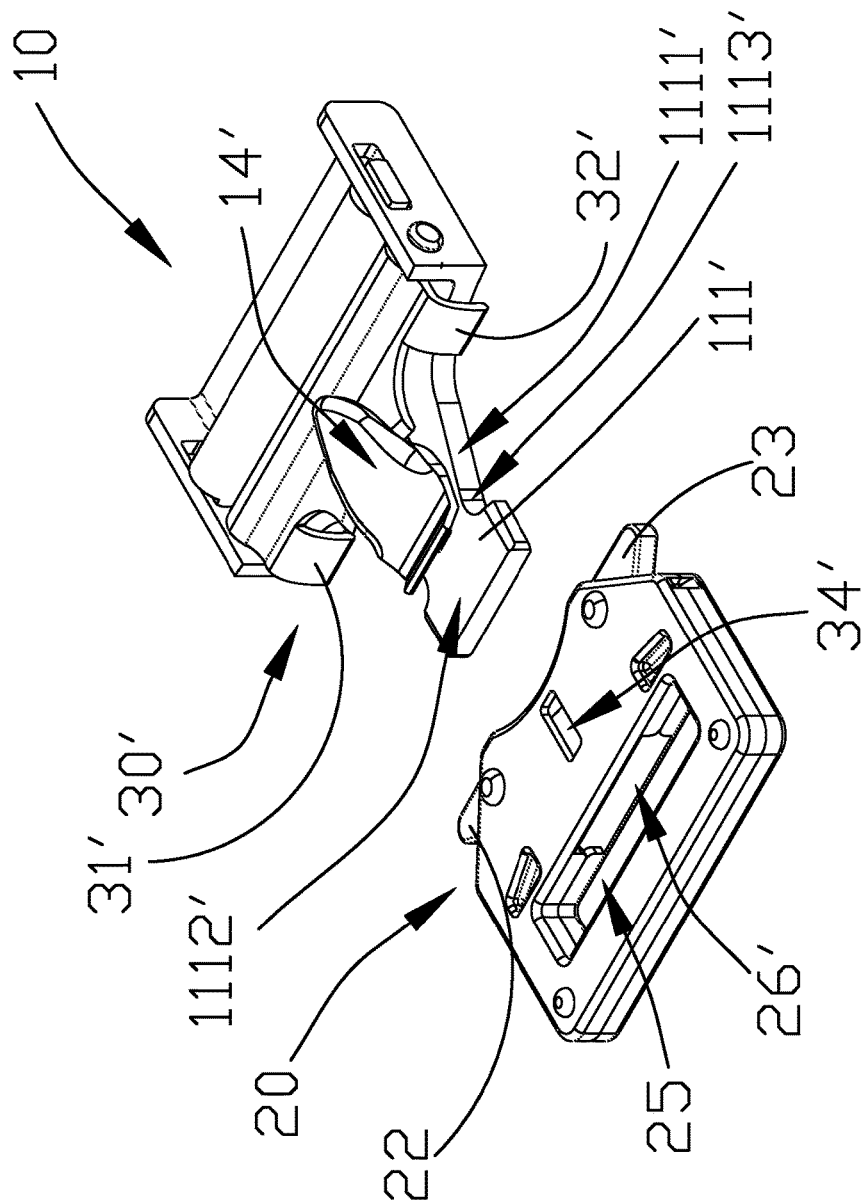
FIG. 8 is an alternative mode of the buckle assembly according to the above preferred embodiment of the present invention.
Figure 9:
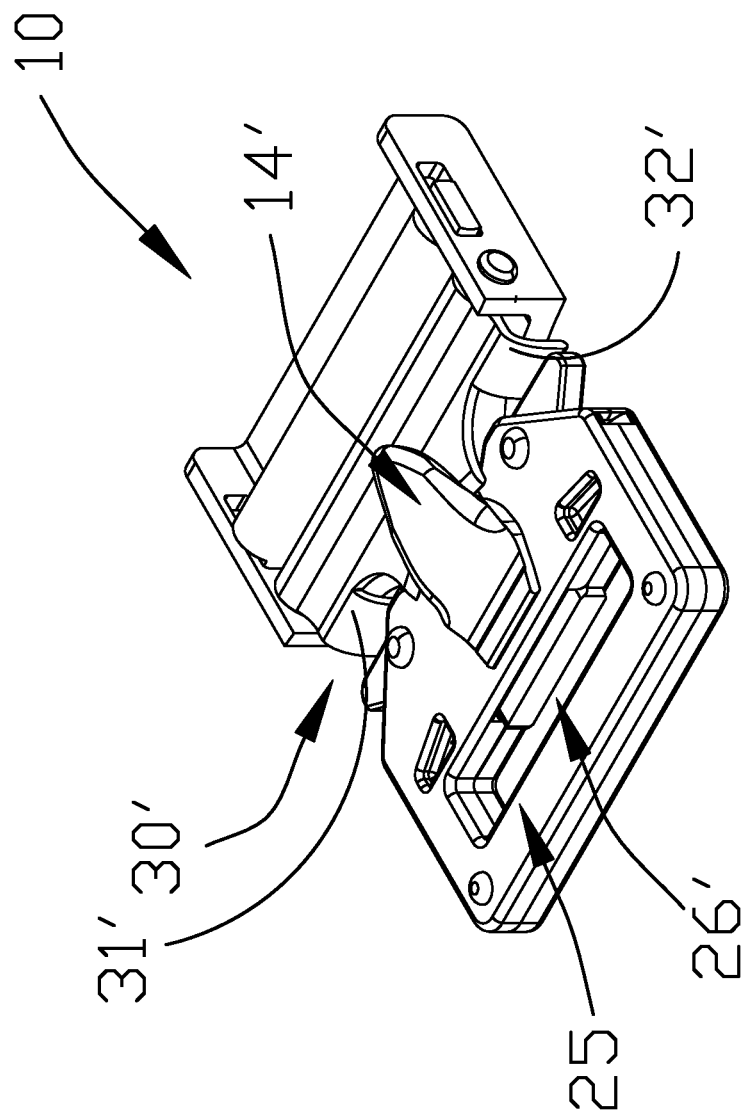
FIG. 9 is an alternative mode of the buckle assembly according to the above preferred embodiment of the present invention, illustrating that a first buckle member is coupled to a second buckle member.

Referring to FIG. 8 to FIG. 9 of the drawings, an alternative mode of the buckle assembly according to the preferred embodiment of the present invention is illustrated. The alternative mode is similar to the preferred embodiment, except the locking arrangement 30' and the insertion member 111'. According to the alternative mode, each of the first locking member 31' and the second locking member 32' may be downwardly extended from two side edges of the covering member 12 respectively for restricting a pivotally movement of the first buckle latch 22 and the second buckle latch 23 when the second buckle member 20 is coupled with the first buckle member 10.

Furthermore, the third locking member 33' may also be extended from the covering member 12 of the first buckle member 10 while the locking slot 34' may also be formed on the second buckle member 20 so that when the first buckle member 10 is engaged with the second buckle member 20, the third locking member 33' is detachably engaged with the locking slot 34'.

Accordingly, the covering member may further have a front extension portion 14', wherein the third locking member 33' is formed on a bottom side of the extension portion 14' of the covering member 12. When the first buckle member 10 is coupled to the second buckle member 20, the third locking member 33' is engaged with the locking slot 34' while the first locking member 31' and the second locking member 32' may be extended to prevent the first buckle latch 22 and the second buckle latch 23 from pivotally moved. Since the third locking member 33' is engaged with the locking slot 34', a longitudinal movement of the first buckle member 10 and the second buckle member 20 are substantially restricted (i.e. the first buckle member 10 and the second buckle member 20 are not capable of moving away from each other). In this state, the first buckle member 10 is prevented from accidentally disengaged from the second buckle member 20 because the pivotal movement of the first buckle latch 22 and the second buckle latch 23 is substantially restricted by the first locking member 31 and the second locking member 32.

As shown in FIG. 8 of the drawings, the insertion member 111' may be integrally extended from the first connecting member 112 for selectively receiving in the receiving slot 211. The insertion member 111' may have a contracting portion 1111' and an engaging portion 1112' extended from the contracting portion 1111' to form an engagement shoulder 1113' at an intersection between the contracting portion 1111' and the engaging portion 1112'. The contracting portion 1111' may have a substantially triangular cross sectional shape. Thus, a width of the contracting portion 1111 is gradually decreasing from the connecting member 112' toward the engaging portion 1112'. On the other hand, the engaging portion 1112' may also have a substantially rectangular cross sectional shape. A width of the insertion member 111' may be at the minimum at the intersection between the contracting portion 1111' and the engaging portion 1112', and this may constitute the engagement shoulder 1113' of the insertion member 111'. The second buckle member 20 may further have an accommodating slot 26' transversely formed on the second buckle body 21, wherein when the first buckle member 10 is coupled to the second buckle member 20, the engaging portion 1112' is arranged to be partially inserted into the accommodating slot 26'.

In order to disengage the first buckle member 10 from the second buckle member 20, a user of the present invention has to disengage the third locking member 33' from the locking slot 34' first. After that, the user is able to pivotally move the first buckle latch 22 and the second buckle latch 23 for disengaging the first buckle member 10 from the second buckle member 20.

The present invention, while illustrated and described in terms of a preferred embodiment and several alternatives, is not limited to the particular description contained in this specification. Additional alternative or equivalent components could also be used to practice the present invention.

What is claimed is:

1. A buckle assembly, comprising:
   a first buckle member which comprises a first buckle body comprising an insertion member, and a covering member movably coupled to said first buckle body, said covering member being pivotally connected to said first buckle body;
   a second buckle member, which comprises:
   a second buckle body having a receiving slot formed at a position corresponding to said inserting member of said first buckle body;
   a first buckle latch and a second buckle latch connected to said second buckle body, each of said first buckle latch and said second buckle latch being arranged to move between a locked position and an unlocked position, wherein in said unlocked position, each of said first buckle latch and said second buckle latch is pivotally moved to allow said insertion member of said first buckle body to be inserted in said receiving slot, wherein in said locked position, each of said first buckle latch and said second buckle latch is pivotally moved to lock up said insertion member of said first buckle body in said receiving slot and a plurality of resilient elements mounted in said second buckle body to normally exert an urging force to normally retain said first buckle latch and said second buckle latch in said locked position respectively; and a locking arrangement, which comprises a first locking member extended from one of said first buckle member and said second buckle member to retain one of said first buckle latch and said second buckle latch at said locked position, wherein said covering member has a front extension portion and is a panel-like member which is pivotally mounted to said first buckle body, said locking arrangement being provided on said covering member so as to restrict unwanted movement of said first buckle latch and said second buckle latch.

2. The buckle assembly, as recited in claim 1, wherein said locking arrangement further comprise a second locking member, wherein said first locking member and said second locking member are downwardly extended from two side edges of said covering member respectively for covering an exposed part of said first buckle latch and said second buckle latch when said second buckle member is coupled with said first buckle member.

3. The buckle assembly, as recited in claim 2, wherein said locking arrangement further comprises a third locking member downwardly extended from said front extension portion of said covering member, and contains a locking slot indently formed on said second buckle body, wherein when said first buckle member is coupled with said second buckle member, said third locking member is pivotally moved to engage with said locking slot so as to prevent unwanted movement of between said first buckle member and said second buckle member.

4. The buckle assembly, as recited in claim 1, wherein said insertion member has a contracting portion and an engaging portion extended from said contracting portion to form an engagement shoulder at an intersection between said contracting portion and said engaging portion.

5. The buckle assembly, as recited in claim 3, wherein said insertion member has a contracting portion and an engaging portion extended from said contracting portion to form an engagement shoulder at an intersection between said contracting portion and said engaging portion.

6. The buckle assembly, as recited in claim 4, wherein said contracting portion has a substantially triangular cross sectional shape in which a width of said contracting portion gradually decreases in a direction of toward said engaging portion, said engaging portion having a substantially triangular cross sectional shape in such a manner that a width of said engaging portion gradually increases from said contracting portion toward a free end of said engaging portion.

7. The buckle assembly, as recited in claim 5, wherein said contracting portion has a substantially triangular cross sectional shape in which a width of said contracting portion gradually decreases in a direction of toward said engaging portion, said engaging portion having a substantially triangular cross sectional shape in such a manner that a width of said engaging portion gradually increases from said contracting portion toward a free end of said engaging portion.

8. The buckle assembly, as recited in claim 6, wherein said resilient elements of said second buckle member is mounted to one end of said first buckle latch and said second buckle latch respectively for normally retaining said first buckle latch and said second buckle latch at said locked position.

9. The buckle assembly, as recited in claim 7, wherein said resilient elements of said second buckle member is mounted to one end of said first buckle latch and said second buckle latch respectively for normally retaining said first buckle latch and said second buckle latch at said locked position.

10. The buckle assembly, as recited in claim 8, wherein each of said first buckle latch and said second buckle latch has a slanted surface facing each other, wherein when said first buckle latch and said second buckle latch are in said locked position, said slanted surfaces are arranged to face toward said opening of said receiving slot and each other, wherein said slanted surfaces are arranged to engage with said engaging portion of said insertion member.

11. The buckle assembly, as recited in claim 9, wherein each of said first buckle latch and said second buckle latch has a slanted surface facing each other, wherein when said first buckle latch and said second buckle latch are in said locked position, said slanted surfaces are arranged to face toward said opening of said receiving slot and each other, wherein said slanted surfaces are arranged to engage with said engaging portion of said insertion member.

* * * * *